Figure 1:
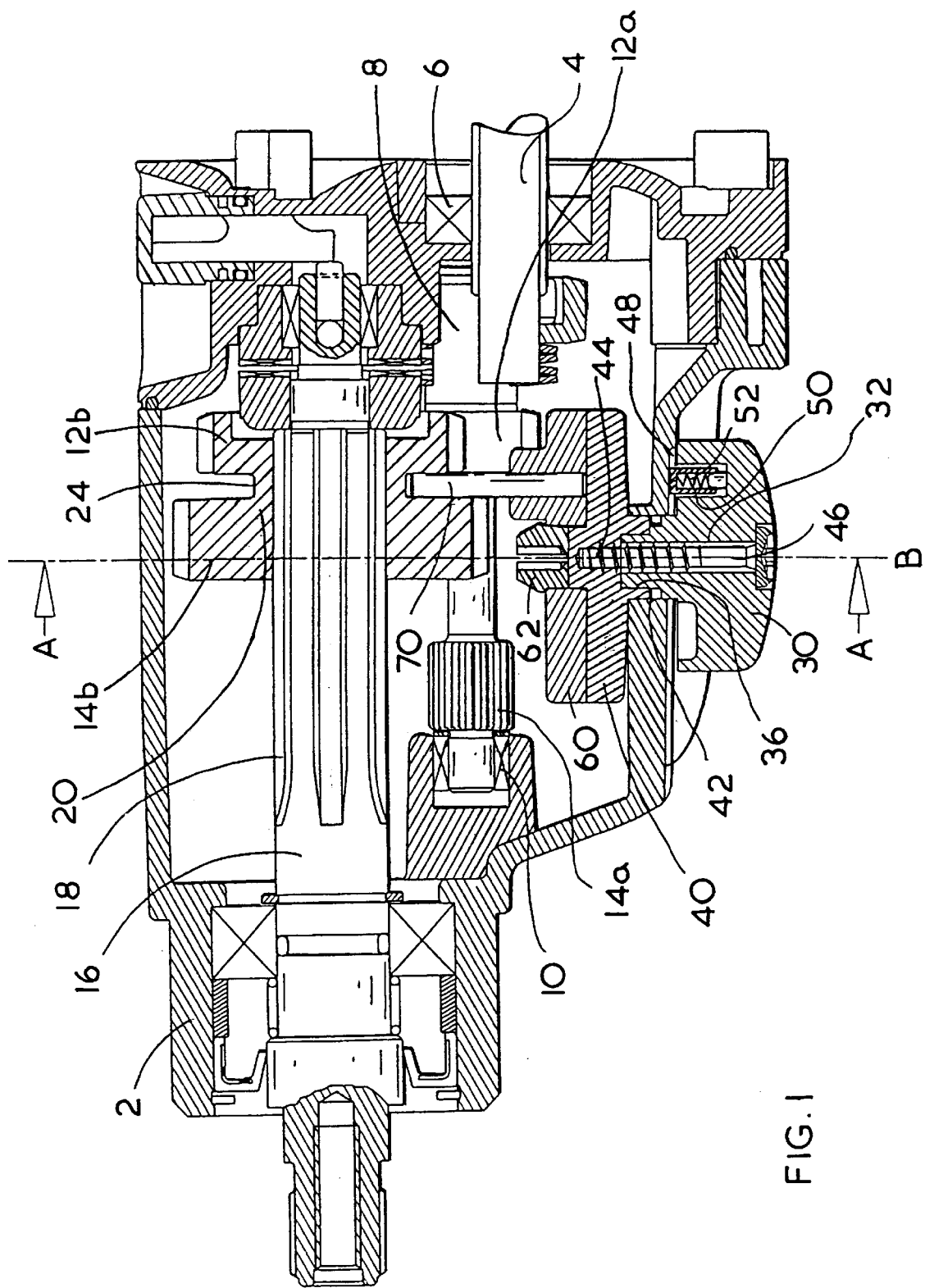

United States Patent
Nemetz et al.

Patent Number: 5,992,257
Date of Patent: Nov. 30, 1999

[54] POWER TOOL WITH MODE CHANGE SWITCH

[75] Inventors: Uwe Nemetz, Hünfelden; Wolfgang Schönweitz, Dietzenbach, both of Germany

[73] Assignee: Black & Decker Inc., Newark, Del.

[21] Appl. No.: 09/229,181

[22] Filed: Jan. 13, 1999

Related U.S. Application Data

[63] Continuation of application No. 08/946,486, Oct. 7, 1997.

[30] Foreign Application Priority Data

Oct. 11, 1996 [GB] United Kingdom ............... 9621202

[51] Int. Cl.$^6$ .............................. F16H 3/08; F16D 3/12; F16D 3/52
[52] U.S. Cl. ............................. 74/371; 464/61; 464/77; 464/84
[58] Field of Search ........................ 74/371, 372, 375; 464/64, 67, 77, 79, 66, 68, 62, 61, 73, 81, 87, 100, 101

[56] References Cited

U.S. PATENT DOCUMENTS

| | | |
|---|---|---|
| 734,838 | 7/1903 | Edgar . |
| 1,956,798 | 5/1934 | Janssen . |
| 2,330,076 | 9/1943 | Ochsenbein . |
| 3,785,443 | 1/1974 | Armbruster . |
| 3,808,904 | 5/1974 | Gotsch et al. . |
| 4,710,071 | 12/1987 | Koehler . |
| 5,305,651 | 4/1994 | Perego . |

FOREIGN PATENT DOCUMENTS

| | | |
|---|---|---|
| 437716 | 7/1991 | European Pat. Off. . |
| 3904085 | 8/1990 | Germany . |
| 2159332 | 11/1985 | United Kingdom . |
| 9315863 | 8/1993 | WIPO . |
| 9604496 | 2/1996 | WIPO . |

*Primary Examiner*—Charles A. Marmor
*Assistant Examiner*—Roger Pang
*Attorney, Agent, or Firm*—Harness, Dickey & Pierce, P.L.C.

[57] ABSTRACT

A mode change switch for a power tool, which switch is moveable between at least two positions corresponding to different operating modes of the tool in which different components of the tool are brought into a meshing engagement. The switch comprises a manually operable driving member moveable between at least two positions in each of which it is adapted to be realizably restrained and a driven member which is adapted to be driven by the driving member between associated positions to directly or indirectly facilitate a change in operating mode. A spring engages between the driving member and driven member, to urge the driven member to follow the movement of the driving member. The switch is arranged so that a first end of the spring abuts a first pair of stop members and a second end of the spring abuts a second pair of stop members. One of each pair of stop members is located on the driving member. And the other of each pair is located on the driven member.

17 Claims, 4 Drawing Sheets

POWER TOOL WITH MODE CHANGE SWITCH

This application is a continuation of Ser. No. 08/946,486 filed Oct. 7, 1997.

The present invention relates to a mode change switch for use on a power tool, such as a drill or a rotary hammer, and in particular a mode change switch which facilitates a mode change by bringing different components of the tool into a meshing engagement. Furthermore, the invention relates to power tools incorporating such a mode selection switch.

Drills generally have a speed reduction gear between a motor (which drives the drill) and an output of the drill. It is often desirable to change the gear reduction ratio, to change the rotary output speed of the drill, depending on the type of drill bit used and the material being drilled. The mode change switch according to the present invention can be used to facilitate such a change in reduction ratio.

The mode change switch could also be used on a power tool such as a rotary hammer or a hammer drill to change the mode of the tool between drill action only, hammer action only and combined drill and hammer action.

One mode change switch for a drill is described in U.S. Pat. No. 4,493,223. The drill's motor drives a first pair of unequal diameter pinion gears which are in continuous engagement with a second pair of pinion gears. The gears of the second pair are mounted next to each other for free rotation on a shaft. An axially sliding key is manually shifted to selectively lock one or the other of the second pair of pinion gears to the shaft. Hence the shaft is rotatably driven by the locked gear which is itself driven by the associated one of the first pair of pinion gears. The speed of rotation of the shaft is changed by shifting the key which moves between two positions to lock one or other of the second pair of pinion gears to the shaft. The output from the shaft may directly drive a drill bit or may indirectly drive a drill bit via a further gear reduction stage. The key is biased into the two positions by means of two springs one located to each side of an actuator. When the actuator is moved in a first direction, one of the springs located as a first side of the actuator acts between the actuator and a part of the key located to the first side of the actuator to bias the key into the first position and when the actuator is moved in a second direction, the other spring located to the second side of the actuator acts between the actuator and a part of the key located to the second side of the actuator to bias the key into the second position. When the key is first moved to engage one of the second pair of pinion gears some rotation of the gear relative to the key may be required before locking engagement can occur. Hence, biasing the key into engagement enables the key to snap into engagement with the gear on the first occasion that the key and gear are correctly aligned after the actuator has been moved to move the key.

In this arrangement, in each position of the actuator, one of the springs is obsolete.

A second mode change switch for a drill is disclosed in DE 3904085. The drill disclosed in this document uses a two stage planetary gear reduction. The first stage transmits a reduction to the second stage when the ring gear of the first stage is locked to the inside of the drill housing. The first stage can be bypassed by locking the ring gear of the first stage to the drive input gear (sun gear) of the first stage so that the planetary gears of the first stage are held stationary relative to the sun and the ring gear. Then the pinions extending from the planetary gears of the first stage drive the sun gear of the second stage at the same speed as the sun gear of the first stage, thus bypassing the first stage reduction.

A locking member which is keyed into the outside surface of the ring gear of the first stage can be manually shifted between a first position in which it can engage one of a plurality of slots in the drill housing (to lock the ring gear to the housing) and a second position in which it can engage one of a plurality of slots in the drive input gear (sun gear) of the first reduction stage (to lock the ring gear to the sun gear). A spring is again used to bias the locking member into each of its two positions. An actuator is linked to the locking member via a specially formed hoop of wire. When the actuator is moved in a direction the hoop of wire becomes tensioned and urges the locking member to move in the same direction to engage the relevant slot as soon as the locking member and the relevant slot become aligned after relative rotation.

The specially formed hoop of wire is a more expensive and complex component than a standard helical or coil spring.

The first aspect of the present invention provides an improved mode change switch for a power tool such as a drill or a rotary hammer by providing a simple, economical, compact and robust switch.

According to the present invention there is provided a mode change switch for a power tool, which switch is moveable between at least two positions corresponding to different operating modes of the tool in which different components of the tool are brought into a meshing engagement, the switch comprising:

a manually operable driving member moveable between at least two positions in each of which it is adapted to be realisably restrained, a driven member which is adapted to be driven by the driving member between associated positions to directly or indirectly facilitate a change in operating mode, and a spring which engages between the driving member and driven member, to urge the driven member to follow the movement of the driving member, characterized in that, a first end of the spring abuts a first pair of stop members and a second end of the spring abuts a second pair of stop members and one of each pair of stop members is located on the driving member and the other of each pair is located on the driven member.

When the driving member is moved to a position in which it is restrained the driven member may not be able to follow the entire movement of the driving member because it is unable to facilitate a mode change because tool components, such as gear members, which have to be meshed in order to facilitate the mode change are not aligned and so are unable to mesh. When the tool is next switched on relative rotation between the components will align the components. When alignment first occurs the spring urges the driven member to complete its movement and facilitate the mode change by directly or indirectly causing the components to mesh.

The switch according to the present invention allows a spring to act between the driven member and the driving member to urge the driven member to follow the driving member whether the driven member is moved in a first direction between a first position and a second position or is moved back in a second opposite direction between the second position and the first position. If the driven member is moved in a first direction a stop member on the driven member at a first end of a spring applies pressure to the spring in a first direction and the second end of the spring applies pressure in the first direction to the stop member of the driven member at the second end of the spring to thus urge the driven member in the first direction so that it follows the movement of the driving member. Also, if the driven member is moved in a second opposite direction a stop member on the driven member at the second end of the spring applies a pressure to the spring in the second direction and the first end of the spring applies pressure in the second direction to the stop member of the driven member at the first end of the spring to thus urge the driven member in the second opposite direction.

Because a spring can be used to drive the driven member in opposite directions between positions the spring is never obsolete. This reduction in obsolescence, as compared to some known arrangements, reduces the number of spring components required and thus provides a cost reduction.

Furthermore, the mode change switch according to the present invention is suited for use with standard off-the-shelf spring components, which are clearly cheaper than purpose built spring components that are used in some known arrangements.

Preferably, the driven and driving members are rotatable between positions, as this enables a compact construction of the mode change switch as compared to a mode change switch that is moved laterally. For a particularly compact construction the driving member and the driven member may be co-axially mounted discs rotatable about their mutual axis.

If the driven disc is rotatable it may drive a key which is eccentrically mounted on the driven disc and which facilitates the change in operating mode. The eccentric key may engage a reduction gear means in order to move the reduction gear means (on rotation of the driven member) between different positions in which the reduction gear means is enabled to transmit drive from a driving spindle to a driven spindle of a power tool at different reduction ratios.

The reduction gear means may comprise two gear wheels of different diameters which are mounted on the driven spindle (or alternatively the driving spindle) to rotate with the driven spindle (driving spindle) and which are axially displaceable by the eccentric key between different positions in which different ones of the gear wheels engage gear wheels provided on the driving spindle (driven spindle).

The mode change switch may comprise more than one spring arranged so that each end of each spring abuts a pair of stop members. If more than one spring is used in this way they cooperate in forming the driving connection between the driving and the driven disc. Thus, if more than one spring is used weaker and thus cheaper springs can be used.

Preferably, the driving and the driven member have adjacent faces and a cavity formed in said face of the driving member cooperates with an associated cavity formed in said face of the driven member to form a chamber for the location of a spring. This advantageously allows a compact and robust arrangement of the mode change switch. A cavity may be provided for each spring, if more than one spring is used. To reduce the number of components the stop members may be formed by the cavity walls.

Figure 2:
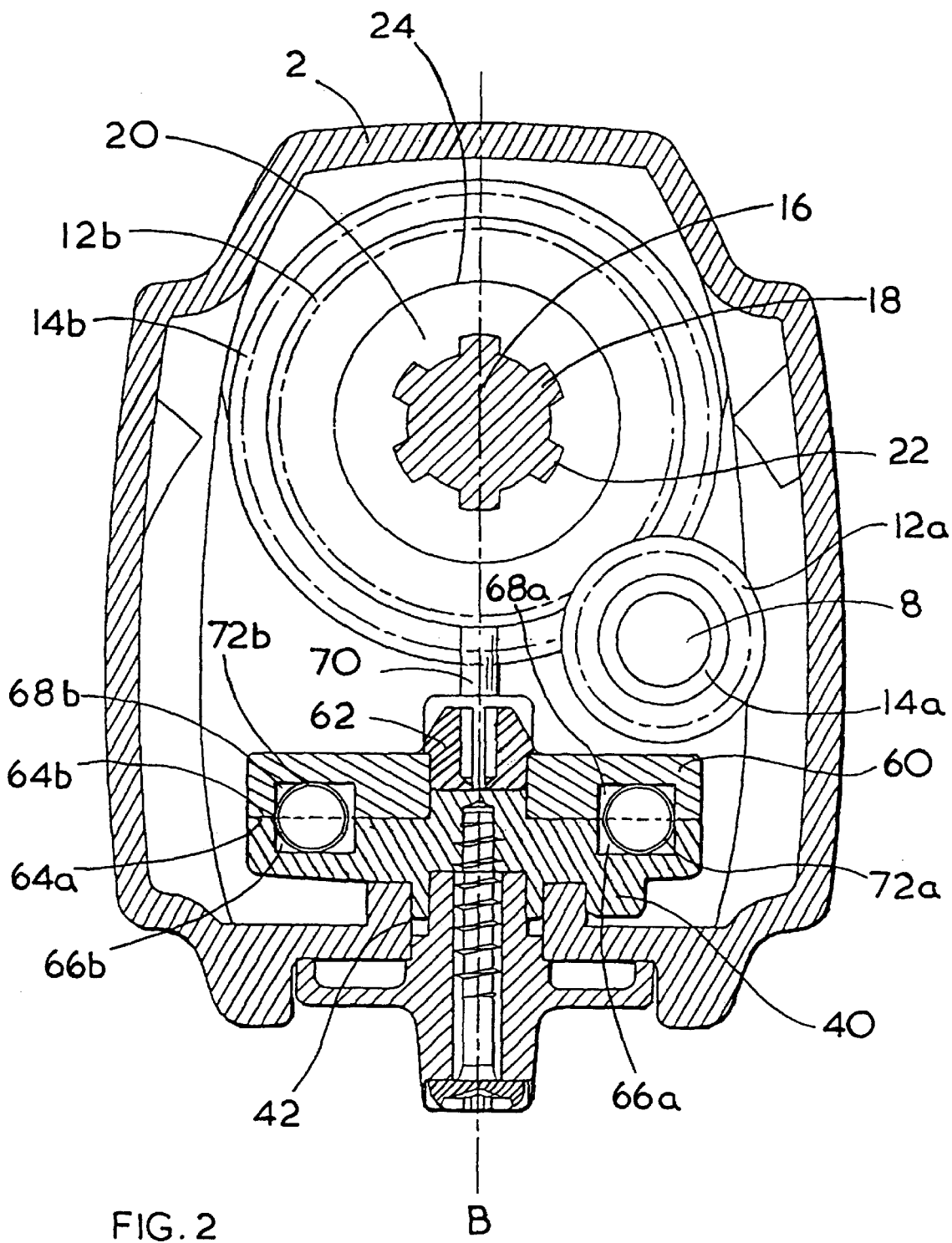
Figure 3B:
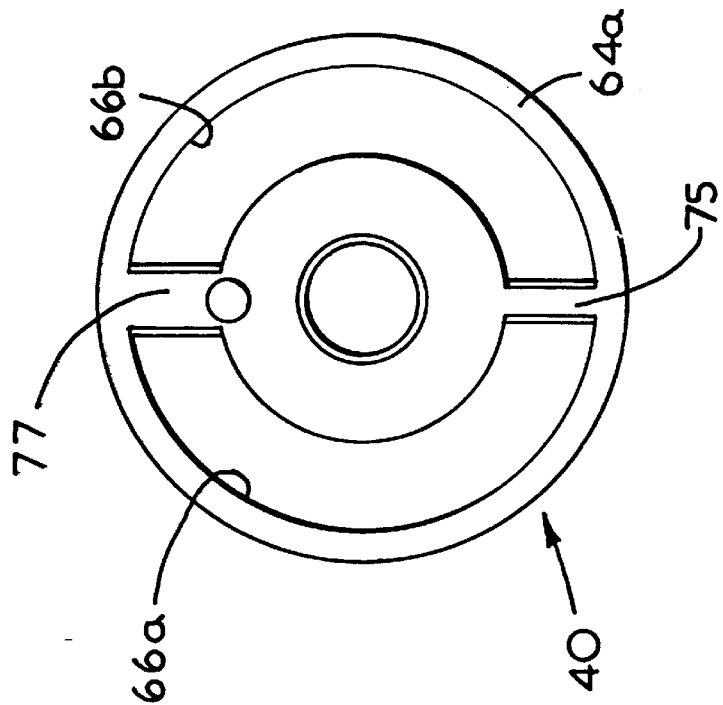
Figure 3A:
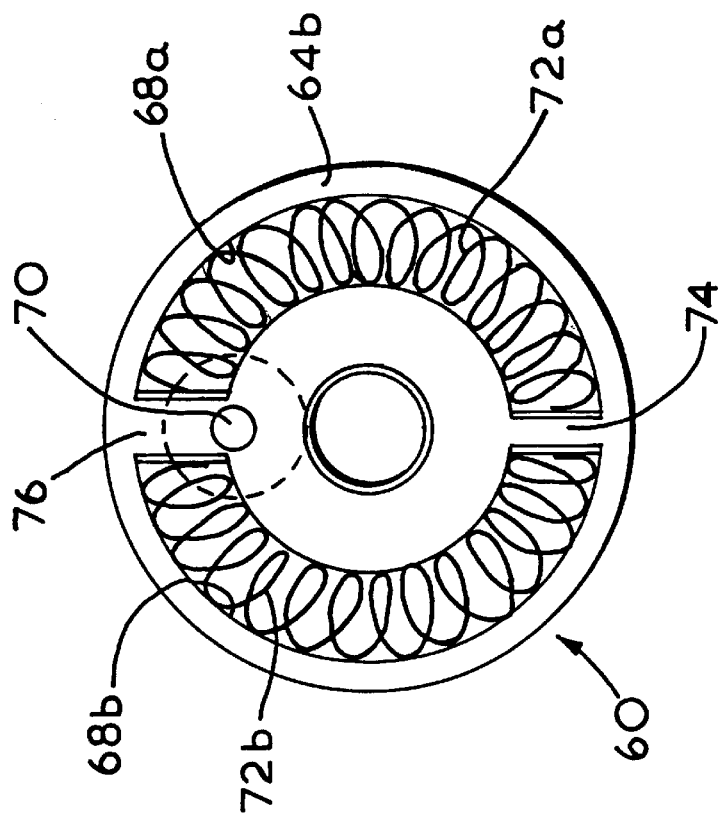

The present invention will now be described in relation to the following drawings, in which:

FIG. 1 shows a partial longitudinal cross section of a drill including a first embodiment of a mode change switch according to the present invention, FIG. 2 shows a transverse cross section across line A—A of the drill shown in FIG. 1, FIGS. 3a and 3b show plan views of the co-operating faces of driving and driven members according to the first embodiment of the mode change switch shown in FIGS. 1 and 2.

Figure 4B:
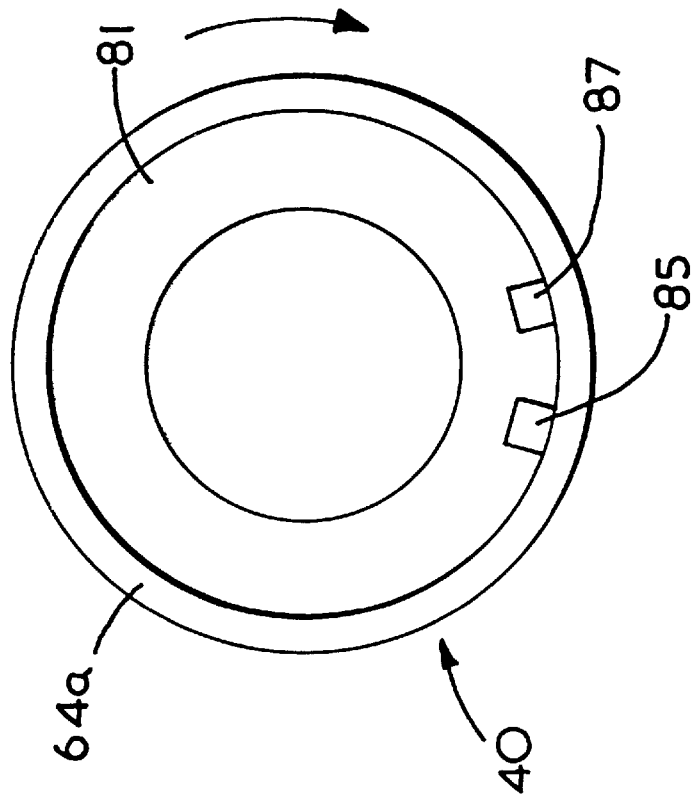
Figure 4A:
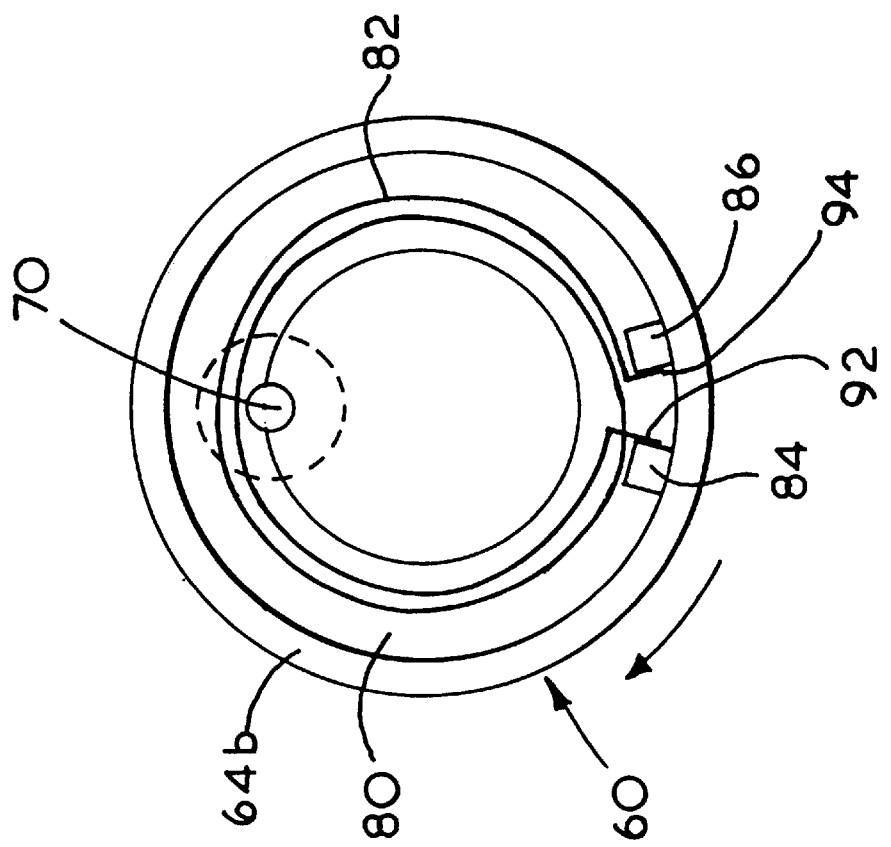

FIGS. 4a and 4b show plan views of the co-operating faces of driving and driven members according to a second embodiment of the present invention.

Referring first to FIGS. 1 and 2 which show cross sections of a hammer drill incorporating a first embodiment of a mode change switch according to the present invention. The drill has a casing (2) which houses the moving parts of the drill and a motor (not shown). The output spindle (4) of the motor is supported for rotation by bearings (6) and drives an intermediate driving spindle (8) via a meshing gear arrangement.

The intermediate driving spindle (8) is supported for rotation by bearings (10) located at the front end of the spindle and bearings (not shown) located at the rear end of the spindle. The intermediate driving spindle (8) carries two gear wheels (12a) and (14a) of different diameters.

A driven spindle (16) is supported for rotation parallel to the driving spindle (8) and provides the output for the drill. A reduction gear block (20) is mounted on the driven spindle (16) with axial slots (22) formed in the reduction gear block (20) keying into splines (18) formed on the driven spindle (16) so that the reduction gear block (20) can slide axially along the driven spindle (16) but is rotatably fixed relative to the driven spindle. The reduction gear block comprises two gear wheels (12b) and (14b) of different diameters separated by a slot (24) which extends around the entire circumference of the reduction gear block (20).

The reduction gear block (20) is slideable on the driven spindle (16) between two positions. The first position is shown in FIG. 1 in which the gear wheels (12a) and (12b) mesh and drive is transmitted at a first speed of rotation from the intermediate driving spindle (8) to the driven spindle (16) via the gears (12a, 12b) at a first reduction ratio. In the second position the reduction gear block is located towards the forward end of the splined section of the intermediate driving spindle (16) (to the left in FIG. 1) and the gear wheels (14a) and (14b) mesh and drive is transmitted at a second lower speed of rotation from the intermediate driving spindle (8) to the driven spindle (16) via the gears (14a, 14b) at a second reduction ratio. The rotation of the driven spindle provides the output for the drill and so the output of the drill can be selected to be one of two speeds of rotation depending on the drill bit being used and the material being drilled.

When the reduction gear block (20) is moved, for example, towards its second position from its first position it may occur that the gears (14a) and (14b) are not aligned to mesh and so the gear block (20) is prevented from moving into its second position. This problem is overcome by biasing the reduction gear block into this second position so that as soon as the intermediate driving spindle (8) and gear (14a) begin to rotate bringing the gears (14a) and (14b) into a meshing alignment the reduction gear block is forced into its second position. When the reduction gear block (20) is moved towards its first position it must similarly be biased into the first position.

The reduction gear block (20) is moved between its two positions by an actuator arrangement shown in FIGS. 1, 2 and 3. The actuator arrangement comprises a knob (30) which has a central screw threaded channel (32) which ends in a neck portion. The neck portion extends through an aperture (42) in the casing (2) of the drill and comprises at least one peg (36). The neck portion is received within a mating aperture provided in a neck portion of a driving disc (40). The mating aperture comprises a recess into which the peg (36) fits to key the knob (30) to the driving disc (40) so that the knob (30) and driving disc (40) rotate together. The driving disc is located within the casing (2) of the drill and has a central screw threaded channel (44) which meets the screw threaded channel (32) of the knob to enable the knob (30) and driving disc (40) to be fixed together by a screw (46). This fixing secures the knob (30) to the outside of the casing (2) and the disc (40) to the inside of the casing (2) via their neck portions in such a way the disc/knob arrangement is free to rotate about axis B relative to the casing (2).

Adjacent to the aperture (42) the casing (2) has two spaced recesses on its outer surface (only one of which is shown at (48)). The knob is provided with a detent pin (50) which is biased by a spring (52) into engagement with the recesses. The knob has two settings which correspond to the two positions of the reduction gear block (20). When the knob is aligned in one of these settings the detent pin (50) will rest in one of the recesses (48) to hold the knob in position. When a user begins to rotate the knob from one of its settings, the detent pin (50) is urged into the knob against the action of the spring (52) by cam surfaces provided at the edge of the relevant recess. This depression of the detent pin (50) allows the knob to be freely rotated to its other setting. When the knob reaches one of its settings the detent pin (50) is urged by the action of the spring (52) into the relevant recess (48) and gives a user of the tool the feel that the knob is in the correct position.

A driven disc (60) is mounted co-axially with the driving disc (40) by a clip (62) so that the driven disc (60) can rotate relative to the driving disc (40). Adjacent faces (64a, 64b) (see in particular FIGS. 2, 3a and 3b) of the discs (40, 60) are formed each with two semicircular cavities (66a, 68a, 66b, 68b) whose ends are separated by stops (74, 75, 76, 77). The adjacent faces (64a, 64b) are brought together when the actuator arrangement is assembled so that the cavities (66a, 68a) form a first chamber in which a first helical spring (72a) is located and cavities (66b, 68b) form a second chamber in which a second helical spring (72b) is located. The first helical spring (72a) is located with one lateral half (the bottom half of the spring as shown in FIG. 2) in cavity (66a) in the driving disc (40) and the other lateral half (the top half of the spring as shown in FIG. 2) in the cavity (68a) in the driven disc (60) with respective ends of the spring abutting respective stops (74, 75 and 76, 77). A second helical spring (72b) is located with one lateral half in cavity (66b) in the driving disc (40) and one lateral half in the cavity (68b) in the driven disc (60) with respective ends of the spring abutting respective stops (74, 75 and 76, 77). The two springs (72a, 72b) provide a driving connection between the driving disc and the driven disc.

An eccentric pin (70) extends from the driven disc (60) and the free end of the pin (70) engages in the slot (24) between the gear wheels (12b, 14b) on the reduction gear block (20).

Rotation of the knob (30) from a first setting to a second setting causes the driving disc (40) which is keyed to the knob (30) to rotate with the knob. This rotation of the driving disc (40) causes the stops (75, 77) between the cavities (66a) and (66b) to press on one lateral half of one end of each spring (72a, 72b). This in turn causes the other lateral half of the other end of each spring to press on the stops (74, 76) between the cavities (68a) and (68b) to cause the driven disc (60) to rotate in the same direction as the driving disc. Whether the driving disc (40) is rotated clockwise or anticlockwise the springs (72a, 72b) will act in co-operation between the driving and the driven disc to rotate the driven disc with the driving disc.

With the knob (30) in a first setting, in a first position, as shown in FIG. 1, the eccentric pin (70) holds the gear reduction block (20) in the position shown, towards the rear of the splined section of the intermediate driven spindle (16). With the reduction gear block (20) in this position the gear wheel (12a) is enmeshed with the gear wheel (12b) so that when the intermediate driving spindle (8) is driven the driven spindle (16) is driven at a first speed via the gears (12a, 12b). If the user of the drill requires the output of the drill to rotate at the second lower speed, he/she will rotate the knob (30) from its first position to a second position. The driving disc (40) rotates with the knob (30) and the springs (72a, 72b) transmit the rotation from the driving to the driven disc (60). The eccentric pin (70) moves with the driven disc (60) along an eccentric path, moving from right to left (in the sense of FIG. 1), sliding within the slot (24) of the reduction gear block (20) to move the reduction gear block (20) from right to left (in the sense of FIG. 1).

If the gear wheel (14a) happens to be in a meshing alignment with the gear wheel (14b) then the reduction gear block is moved directly into its second position in which the gear wheels (14a) and (14b) are enmeshed, such that rotation of the intermediate driving spindle (8) will drive the driven spindle (16) via gears (14a, 14b) at a second slower speed of rotation.

If the gear wheels (14a) and (14b) do not happen to be in meshing alignment, the reduction gear block (20) is prevented by the abutment of unaligned gear teeth from moving into its second position. Therefore, the eccentric pin (70) and thus the driven disc (60) are prevented from finishing their rotation. However, the user is not prevented from moving the knob (30) into its second position because the springs (72a, 72b) compress to allow the driven and driving discs (40, 60) to rotate relative to each other. Then, when the user switches on the power to the drill, as soon as gear wheel (14a) has rotated into alignment with the gear wheel (14b) the springs (72a, 72b) act to urge the driven disc (60) and eccentric pin (70) to finish their rotation and move the reduction gear block (20) into its second position towards the forward end of the splined section of the intermediate driven spindle (16). The gear wheels (14a) and (14b) are thus enmeshed, such that further rotation of the intermediate driving spindle (8) will drive the driven spindle (16) via gears (14a, 14b) at a second slower speed of rotation.

When the user moves the knob (30) back from the second position to the first, if the gear wheels (12a) and (12b) are not in meshing alignment so that the reduction gear block (20) cannot move into its first position, the springs (72a, 72b) similarly compress to allow relative rotation between the driving disc (40) and the driven disc (60) (in the opposite sense to that described above for the movement from the first position to the second position), so that the reduction gear block (20) is forced by the action of the springs (72a, 72b) into its first position as soon as gear wheels (12a) and (12b) become aligned after rotation of the gear wheel (12a).

A second embodiment of the present invention is shown in FIGS. 4a and 4b, in which like parts are denoted by the same numbers as already used in FIGS. 1, 2, 3a and 3b. The difference between this second embodiment and the first embodiment described above is the driving connection between the driving disc (40) and the driven disc (60). The identical adjacent faces of the discs, each have an annular cavity (80, 81) centered on the rotational axis of the discs. When the actuator arrangement is assembled the adjacent faces (64a, 64b) of the discs come together and the cavities (80,81) form an annular chamber within which a coil spring (82) is located. At each end of the coil spring is formed a plate (92, 94). One lateral half of each plate (92, 94) extends into the cavity (81) in the driving disc and the other lateral half of each plate (92, 94) extends into the cavity (80) in the driven disc (60). A pair of stops (84, 86) is provided in the cavity (80) between which are held one half of each plate (92, 94). Similarly, a pair of stops (85, 87) is provided in the cavity (81) between which are held the other half of each plate (92, 94).

The driving connection works in a very similar way to that of the first embodiment described above. When the driving disc (40) is rotated clockwise (in the sense of the arrow in FIG. 4b), the stop (87) will push on the plate (94) to thus apply pressure to one end of the coil spring (82). The other plate (92) at the other end of the thus compressed the coil spring (82) then acts on the stop (84) on the driven disc (60) to rotate the driven disc clockwise in the same direction as the driving disc (in the sense of the arrow in FIG. 4a). When the driving disc (40) is rotated anti-clockwise, the stop (85) will push on the plate (92) to apply pressure to the coil spring (82). The other plate (94) then acts on the stop (86) on the driven disc (60) to rotate the driven disc anti-clockwise.

As with the first embodiment, when the user moves the knob (30) from the one position to the other, if the gear wheels (21a, 12b) or (14a, 14b) are not in meshing alignment so that the reduction gear block (20) cannot move into its other position, the coil spring (82) compresses to allow relative rotation between the driving disc (40) and the driven disc (60), so that the reduction gear block (20) is forced by the action of the coil spring (82) into its other position as soon as gear wheels (12a, 12b) or (14a, 14b) become aligned.

It is clear that the mode change switches of the first and second embodiments of the present invention each of which provides a back and forth movement of an actuating member (actuating pin (70)) between two positions and can provide biasing of the actuating member into the two positions, is equally applicable to the gear arrangements described in U.S. Pat. No. 4,493,233 and DE 3904085.

We claim:

1. A mode switch for use in a power tool comprising:
a manually operable driving member moveable between at least first and second positions corresponding to different operating modes of the power tool and releasable restrained in the first and second positions;
a driven member drivable by the driving member between third and fourth positions associated with the first and second positions to directly or indirectly facilitate a change in the operating mode;
a first spring engaged between the driving member and the driven member to urge the driven member to follow the movement of the driving member;
a first end of the first spring abutting a first pair of stop members;
a second end of the first spring abutting a second pair of stop members;
one of said stop members of said first and second pairs of stop members is located on the driving member; and the other stop members of said first and second pairs is located on the driven member.

2. A mode change switch according to claim 1, wherein:
the driving member is rotatably mounted for movement between the first and second positions;
the driven member is rotatably mounted for movement between the third and fourth positions.

3. A mode change switch according to claim 2, wherein the driving member and the driven member are co-axially mounted discs rotatable about their mutual axis.

4. A mode change switch according to claim 2, further comprising a key eccentrically mounted on and driven by the driven disc to facilitate the change in operating mode.

5. A mode change switch according to claim 1, further comprising:
a second spring and
the first and second ends of the second spring abutting, respectively, the first and second pairs of stop members.

6. A mode change switch according to claim 1, wherein:
the driven member and the driving member have adjacent faces, and
first and second cavities are formed, respectively, in the faces of the driving and driven members and form a first chamber for receiving the first spring.

7. The mode change switch of claim 6, further comprising:
second spring; and
a second chamber formed in the driving and driven members for receiving the second spring.

8. A mode change switch according to claim 6, wherein the first and second pairs of stop members are located within the cavity walls.

9. A mode change switch according to claim 6, wherein the first and second pairs of stop members are formed by the cavity walls.

10. A power tool comprising:
a casing;
a mechanism disposed in the casing and operable in first and second operating modes;
a mode switch comprising:
a manually operable driving member mounted in casing and moveable between at least first and second positions corresponding to the first and second operating modes;
a driven member drivable by the driving member between third and fourth positions associated with the first and second positions to directly or indirectly facilitate a change in the operating mode;
a first spring engaged between the driving member and the driven member to urge the driven member to follow the movement of the driving member;
a first end of the first spring abutting a first pair of stop members;
a second end of the first spring abutting a second pair of stop members;
one of said stop members of said first and second pairs of stop members is located on the driving member; and the other stop member of said first and second pairs is located on the driven member.

11. The power tool of claim 10 further comprising a detent engagable between the casing and the driving member for releasably restraining the driving member in the first and second positions.

12. The tool of claim 10, wherein:
the driving member is rotatably mounted for movement between the first and second positions and
the driven member is rotatably mounted for movement between the third and fourth positions.

13. The tool of claim 12 wherein the driving member and the driven member are co-axially mounted discs rotatable about their mutual axis.

14. The tool of claim 12 wherein:
the switch comprises a key eccentrically mounted on and driven by the driven disc, and
the key is engaged with the mechanism to change the operating mode.

15. The tool of claim 10 wherein the switch comprises:

a second spring and the first and second ends of the second spring abutting, respectively, the first and second pairs of stop members.

16. The tool of claim 10 wherein:

the driven member and the driving member have adjacent faces, and first and second cavities are formed, respectively, in the faces of the driving and driven members and form a first chamber for receiving the first spring.

17. The tool of claim 16 further comprising:

second spring; and a second chamber formed in the driving and driven members for receiving the second spring.

* * * * *